Jan. 26, 1954
J. W. BAUM
2,667,008
TROLLING HARNESS
Filed Oct. 30, 1950
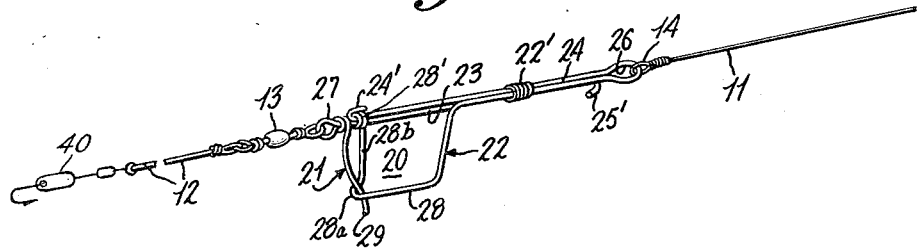
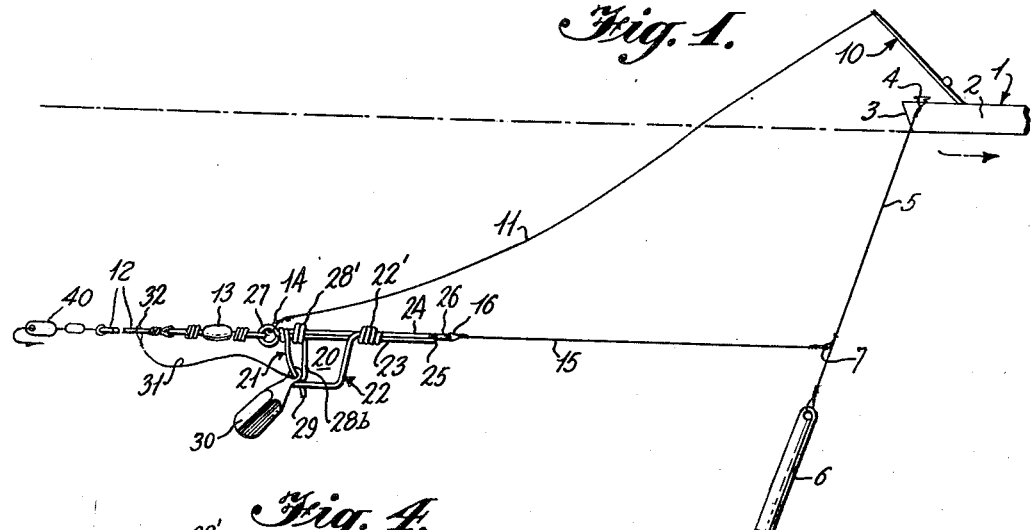
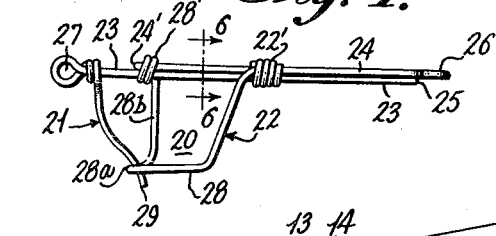
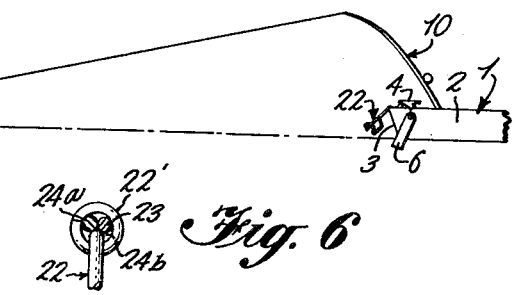
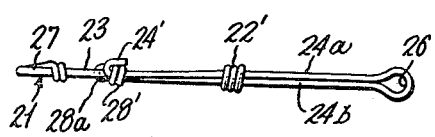
INVENTOR
John W. Baum
BY O'Boyle + Blair
Attorneys Patented Jan. 26, 1954

2,667,008

UNITED STATES PATENT OFFICE 2,667,008

TROLLING HARNESS

John W. Baum, Eugene, Oreg.

Application October 30, 1950, Serial No. 193,003

3 Claims. (Cl. 43—43.15)

This invention relates to improvements in fishing tackle for underwater trolling, and, more particularly, to triggered, shock-absorbing, yieldable connectors or trolling releases joining the leader and fishing line and adapted to absorb the initial impact of the "strike," before the tension on the leader is imposed on the fishing line. The invention also relates to a novel, weighted trolling harness for deep trolling with unweighted lures, and incorporating a two-piece trolling release which is dismembered when a "strike" is made.

In deep trolling for game fish considerable difficulty is encountered, even by adepts, in maintaining weighted lures at the desired depths below the surface. Additionally, the maintaining of the lures at the desired deep trolling depths, with the manipulation of the rod and line to maintain such depths, and to effectively hook a game fish when the "strike" is made, requires a combination of the utmost skill and favorable circumstances.

I have found that the above enumerated difficulties can be essentially overcome by eliminating the weighting of the lure, and providing what I term a "drop sinker triangle," in which a heavy, weighted line is secured to a boat, adjacent the angler's seat, and a second, relatively short line is connected to and between the heavy line and the leader to the lure. A two-piece trolling release connects the leader to the short line and is adapted to be automatically released when the "strike" is made at the lure, whereby the initial shock due to the "strike" is taken up in the lost motion triggering of the device, and the tension of the leader is transferred through the fishing line to the rod only when the "strike" is made.

It is, therefore, among the objects of the present invention to provide improved deep trolling fishing tackle with automatic depth maintenance, including a shock-absorbing, triggered release connecting the leader to the depth maintaining device and adapted, upon a "strike" being effected at the lure, to take up the initial impact, and to be unlatched, whereby to simultaneously transfer the pull of the fish to the fishing rod and to disconnect the leader from the depth maintaining device.

Other objects of the present invention include special, two-part, shock-absorbing triggered connectors or releases, and associated equipment in combination with trolling lines.

A further object of the invention is the provision of two-part, shock-absorbing, trolling releases having a restricted travel or yield, as well as such trolling releases with mutually detachable parts.

The above and other desirable objects of the present invention will be more clearly understood by reference to the accompanying drawings and description thereof wherein preferred forms of the invention are shown and described, by way of illustration only, for, since the underlying features may be incorporated in other specific devices, it is not intended to be limited to the ones here shown except as such limitations are clearly imposed by the appended claims.

In the drawings, like numerals refer to similar parts throughout the several views of which Fig. 1 is a diagrammatic showing of the mounting of the novel shock-absorbing, deep trolling tackle;

Fig. 2 is a view similar to Fig. 1 showing a fishing line and connections, after a "strike" is made;

Fig. 3 is a detail of a triggered trolling release of the light duty type directly connecting the fishing line from the rod to the leader of the lure;

Fig. 4 is a side elevation and Fig. 5 is a plan view of the detachable triggered trolling release or connector of Figs. 1 and 2; and Fig. 6 is a cross-section taken on line 6—6 of Fig. 4.

Referring now to the drawings, a boat 1, having sides 2 and stern 3, mounts a cleat or other securing member 4 adjacent the stern. To this cleat is secured a heavy line 5 which supports a sash weight or other like device 6 at its lower end. An adjustable eyelet 7 is secured in place on the line 5, and at any predetermined distance, as will be described more in detail hereinafter. A fishing rod 10 is secured in place in the boat in any desired manner, as in a holder, and can be fixedly mounted, or removable for hand control. The fishing line 11 connects the rod to the leader 12 through swivel connector 13 and looped end 27 of the two-part, spring wire, triggered trolling release 20. The other end of the trolling release 20 is connected to line 15, and heavy drag line 5, through connections 16 and 7.

The separable, two-piece trolling release 20 comprises a shock-absorbing, trigger member 21, and a combination connector-latch member 22. The member 21 includes a straight body portion 23, of suitable length, having a free end 25, and looped on itself to form an eyelet 27, and extended laterally to form a shock-absorbing spring release or latch member 29. The member 22 comprises a rectilinear top portion 24 comprised of parallel legs 24a and 24b joined in a continuous loop or eyelet 26. The longer leg, 24a, terminates in a hook 24', while the shorter leg 24b is bent downwardly and then horizontally to the rear, as shown at 28. It is reversely bent at 28a, and then bent upwardly, as shown at 28b, to terminate in a looped end 28′, the turns of which are engaged and locked by hook 24′. A coiled keeper 22′ is slidably mounted on and over section 24, eyelet 26 and section 22, serving as end stops therefor. The member 22′ may also be formed of flat sheet metal, not shown, bent to shape on and over member 24.

The members 21 and 22 of trolling release 20 are desirably made of hard drawn wire of any rust-resistant metal, such as stainless steel, or suitably protected spring brass. When the "strike" is made, section 21 will be detached from section 22, against the bias of latch member 29, and the tension in leader 12 will be transferred through line 11 to the fishing rod 10. The line 11 is connected to swivel connector 13 by loop 14, which is fixedly connected to eyelet 27 of trigger member 21. With the "strike" made, and the line in the condition shown in Fig. 2, there will be no extraneous equipment to interfere with the angler fighting the fish, and the drag line 5 and attachments can be drawn up into the boat, as shown, out of the way. The heavy line 5 is of any desired length, and the short line 15 can desirably be of the order of 10 feet long. With this combination, and as shown in Fig. 1, the line 5 will be carried rearwardly at an angle to the boat by the sash weight 6, and the combination will act as a weed guard, thereby reducing possible snagging against underwater obstructions. This feature is of particular importance in bottom fishing as the leader and its lure are thereby protected.

To counteract the tendency of the trolling release 20 to spin or twist while trolling, a sinker 30 may be secured on and over latch member 29 and held in place thereby. When the latch is released the sinker will be detached and may be permitted to fall to the bottom, being lost. Where it is desired to keep the sinker and not lose it, it may be attached to a line 31 of relatively short length, and having a looped end or connection 32 slidably fitted on and over leader 12. With such a device, when the "strike" is made, the sinker 30 will be carried back or slide down to the lure, and there will be no possibility of its interference with the fighting of the game fish.

The invention herein, as described immediately above, is particularly adapted for use in deep trolling for game fish where the fisherman can have the sport of fighting the fish without the usual weight at the lure. In conventional deep trolling practice, to secure the necessary trolling depth, the lure must be suitably weighted. By the improvements herein the weighting of the lure is entirely done away with and no added burden is imposed on either the fish or the fisherman. The trolling depth, as is readily apparent from the description herein, will be determined by the position of connector 7 on the drag line 5. Leader 12 having a lure 40 secured thereto and connector 15 will ride relatively horizontal, and this condition can be assured, as well as twisting of the lines prevented, by utilizing a two-ounce sinker or the like, as a detachable weighting device for the triggered trolling release 20.

Where surface trolling is to be used, and as shown in Fig. 3, the fishing line 11 is connected to the leader 12 through the trolling release 20, the line being secured to eyelet 26 of the body portion 22, and the leader, or rather its swivel connector 13, to the eyelet 27 of latch member 21 of the release. As the tension on the line, during surface fishing, will not approximate the tension obtaining in deep trolling, the sections 21 and 22 of connector 20 may be secured or fastened for limited yielding movement rather than complete mutual detachment. This is accomplished by forming the free end 25 of latch member 21 as an inturned hook 25′, as shown in Fig. 3. With such a device, when a "strike" is made and member 21 is unlatched from connector 20, the leg 23 will be pulled rearwardly of the device, and its movement will be arrested when its hooked end 25′ carries keeper 22′ into engagement with section 22. In this condition the tension from the leader is transmitted directly to the fishing line through the connector which has subserved its initial useful purpose of a snubber or shock absorber for avoiding a direct jerk on line 11 while insuring that the tension necessary for embedding the hook at the moment of the "strike" is effected by the spring bias or tension of the latch member 29.

The novel trolling releases herein are, as previously noted, of two-part construction and mutually detachable or mutually yieldable and interlocking and can be made of any suitable rust-proof spring wire, and in any desired gauge, depending upon the fishing conditions to be encountered. The complete or limited detachability of the component parts of the connectors can be varied to suit the user, and the components can be separately fabricated and sold, with all parts interfitting, so that replacements can be readily made. The completely detachable member of Figs. 4 to 6 can be made interlocking by the simple expedient of looping the end 25 to form a hook 25′, as shown in Fig. 3. The striking tension of the device can be regulated at will by suitably varying the configuration of spring latch member 29. All of these adjustments can be made with a simple pliers by the fisherman at the time of use. Thus, if it is found that a suitable "strike" cannot be made because of improper tension in the latch member, the deficiency can be immediately remedied by bending the latch to the proper shape.

To sum up, the novel drop sinker triangle of the present invention has the following advantages: It can be used for deep trolling for game fish by releasing the sinker weight from the line, thereby giving the fisherman the sport of fighting a fish without a weight; using a short line from the sinker to the leader the sinker will slide down to the lure where it will not interfere with the work of the sport of "playing" with the fish; the device can be used as a two-piece trolling release for very deep trolling; it can be manufactured and sold to the public at very reasonable cost and with trouble-free performance; it can be manufactured in various sizes for all types of underwater fishing; because of its two-part construction the spring trigger part may be sold as a separate item to reduce the cost to the public if the trigger should be lost or broken; the trigger is adjustable to any desired tension by bending to secure the hook setting tension; is snag-proof because the heavy weight on being caught, can be released, giving a slack line, unhooking the trigger; the trolling weight, carries at an angle to the rear of the boat, thereby reducing possible snags; there are no steel springs to deteriorate or rust; there is nothing to hold water to cause corrosion; any small hole sinker, within the capacity of the trigger, may be used, or special sinkers may be made.

I claim:

1. A trolling harness for deep trolling with unweighted lures comprising a fishing lure and a leader therefor, a swivel connector for the leader, a two-part shock-absorbing trolling release, a weighted drag line, a line connecting the connector and the drag line adjacent the weighted end thereof, a fishing line connected to the trolling release, the drag line and the two-part release maintaining the lure with its leader at the desired trolling depth, the parts of the release being mutually displaceable upon the application of a predetermined tension to the leader, whereby to disconnect the leader and the drag line and transfer the tension on the leader directly to the fishing line.

2. A trolling harness for deep trolling with unweighted lures comprising, a fishing line, a lure and a leader therefor, a swivel connected to the leader, a bi-partite shock-absorbing trolling release connected to the swivel and to the fishing line, said shock-absorbing trolling release comprising a first wire member having a straight body section bent and coiled on itself at one end to form an eyelet and a lateral spring arm; a second wire member having an elongated body portion terminating at one end in an eyelet and offset at the other end to form a latch keeper, said keeper receiving the lateral spring arm in spring bearing engagement, the two said wire members being mutually displaceable, against the spring bias of said spring arm, by opposed pulls on the two wire members, and weighted drag line means connected to the eyelet of the second wire member of the release means and maintaining the trolling release and the attached lure at a desired trolling depth, said second wire member being automatically detached from the release upon application of a predetermined tension to the leader.

3. A trolling harness for deep trolling with unweighted lures comprising, a fishing line, a lure and a leader therefor, a swivel connected to the leader, a bi-partite shock-absorbing trolling release connected to the swivel and to the fishing line, said shock-absorbing trolling release comprising a first wire member having a straight body section bent and coiled on itself at one end to form an eyelet and a lateral spring arm; a second wire member having an elongated body portion terminating at one end in an eyelet and offset at the other end to form a latch keeper, the said keeper having its free end coiled about the body portion to form a journal bearing, a second, coiled wire keeper slidably engaging the body section, said bearing and said second keeper receiving the body portion of the first said wire member in sliding locking engagement, and the said latch keeper receiving the lateral spring arm in spring bearing engagement, the two said members being mutually displaceable, against the spring bias of said spring arm, by opposed pulls on the two said members, and weighted drag line means connected to the eyelet of the second wire member of the release means and maintaining the trolling release and the attached lure at a desired trolling depth, said second wire member being automatically detached from the release upon application of a predetermined tension to the leader.

JOHN W. BAUM.

References Cited in the file of this patent

UNITED STATES PATENTS

| Number | Name | Date |
|---|---|---|
| 1,645,874 | Sanford | Oct. 18, 1927 |
| 2,271,899 | Miller | Feb. 3, 1942 |
| 2,322,536 | Miller | June 22, 1943 |
| 2,520,562 | Peeler | Aug. 29, 1950 |
| 2,545,185 | Winslow | Mar. 13, 1951 |
| 2,562,054 | Mathieu | July 24, 1951 |